T. J. McCOY.
GLASS MANUFACTURE.
APPLICATION FILED APR. 4, 1912.

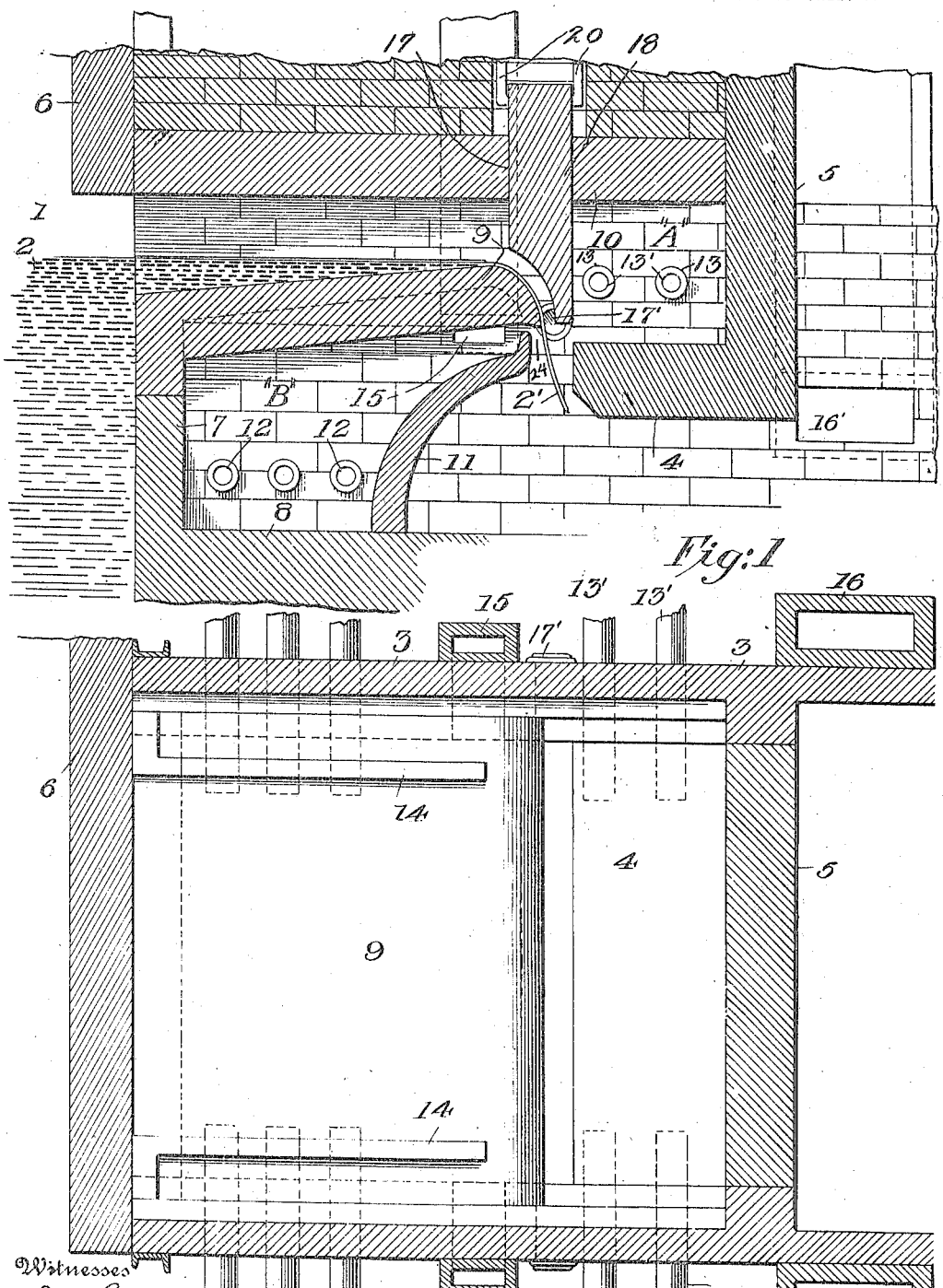

1,255,450.

Patented Feb. 5, 1918.

Witnesses

Thos. J. McCoy, Inventor

By Adrian Dwyer
his Attorney

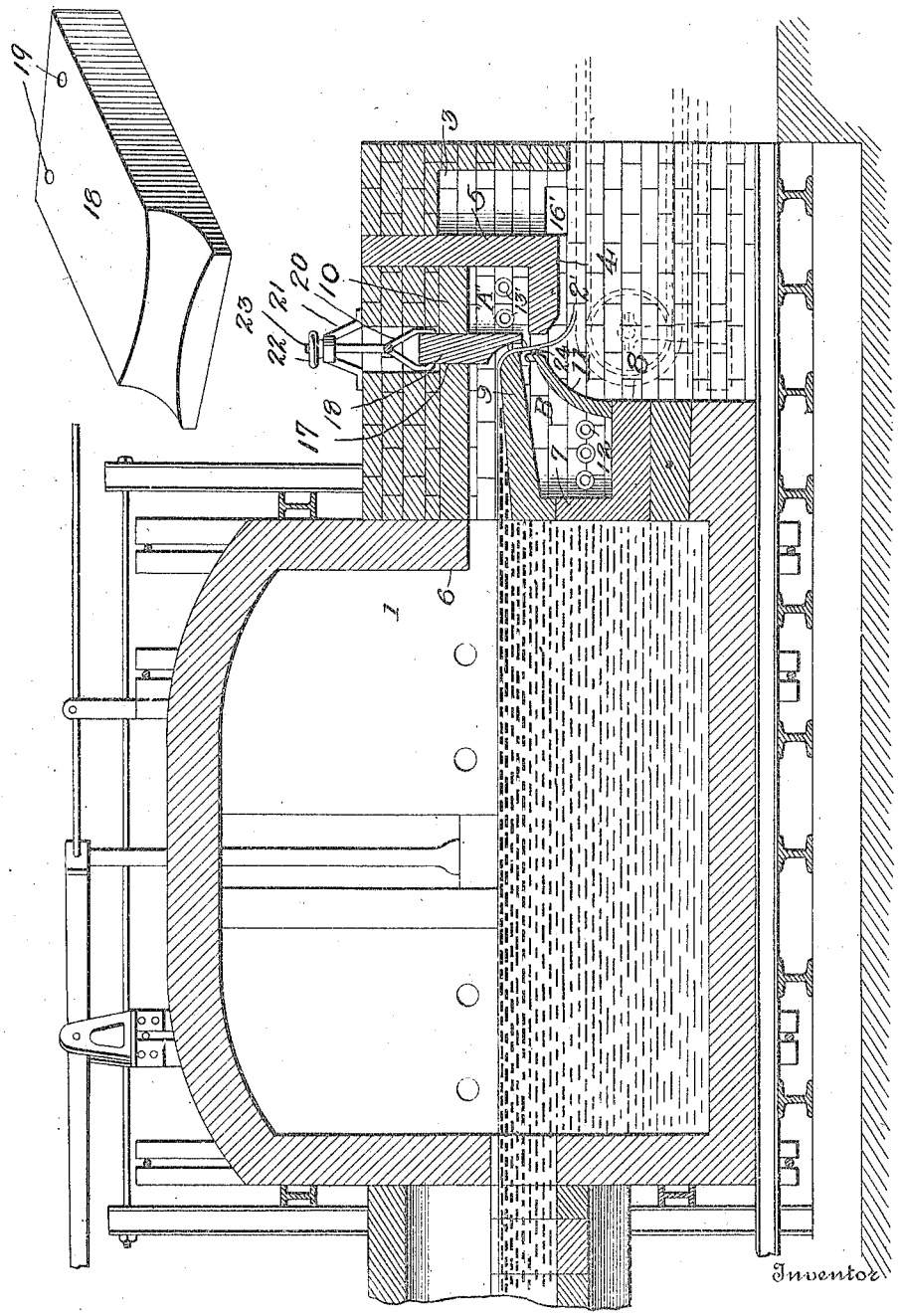

UNITED STATES PATENT OFFICE.

THOMAS J. McCOY, OF KANE, PENNSYLVANIA.

GLASS MANUFACTURE.

1,255,450.     Specification of Letters Patent.     Patented Feb. 5, 1918.

Application filed April 4, 1912. Serial No. 688,408.

*To all whom it may concern:*

Be it known that I, THOMAS J. McCoy, a citizen of the United States, residing at Kane, in the county of McKean and State of Pennsylvania, have invented certain new and useful Improvements in Glass Manufacture, of which the following is a specification.

This invention relates to an improved process and apparatus for the manufacture of glass articles, such for example as window glass, or other forms of sheet glass.

The primary object of this invention is to convert the molten glass into sheet formation by a method and apparatus which dispenses with the usual means employed in blowing, drawing, ladling, pouring from pots crucibles and the like, and flattening, annealing, etc., of the glass at intermittent periods.

These, and further objects will more fully appear from the following description, in which reference will be had to the accompanying drawings forming a part of this application which shows a form of apparatus embodying my said invention, and wherein, Figure 1, is a fragmentary sectional view of the discharge end of a glass tank and accessories showing a sheet of glass being formed by flowing a sheet from the molten glass in the tank.

Fig. 2, a top plan view, partly in section of the discharge end of the glass tank shown in Fig. 1.

Fig. 5, is a fragmentary sectional view of my apparatus showing glass being flowed from the supply tank through the flowing zone.

Fig. 6, is a detail perspective view of the movable shield placed within the flowing zone.

Figure 3:
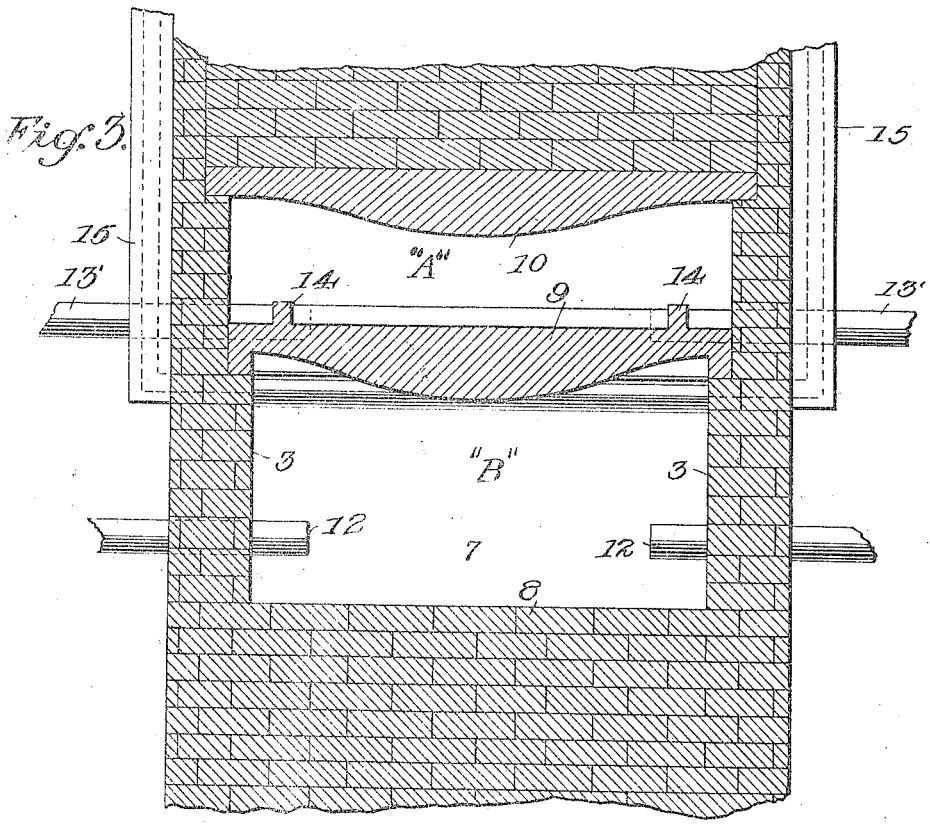
Fig. 3, represents a cross section of Fig. 1.

Referring to the drawings, 1 represents the glass tank containing the molten glass; except as to that portion of the tank from which the glass is flowed or discharged, this tank may be of any desired construction, although preferably of such construction as shown in my prior application for Letters Patent, Serial No. 652780 filed by me on Oct. 4, 1911, of which a portion is shown in Fig. 5, but as to the discharging or flowing compartments, it is of novel construction especially adapted for carrying out my improved process.

The compartment "A" as shown is constructed by building out from the main tank 1, wing walls 3—3 which are joined by a horizontal bridge 4, upon which is erected an end wall 5, connecting the wing walls 3—3, and extending upward to the cap stone 10 placed over compartment "A."

Across the end of the glass tank 1, is an arch wall 6, extending over and above the glass 2, in the tank. Below the arch wall 6, and slightly forward thereof is the end wall 7, of the tank 1, which is built upon the foundation 8. Resting upon the wing walls 3—3, and upon the end wall 7, is a gradually shallowing flume or spout 9, of refractory material which constitutes an important feature of this invention. Located above the spout 9, and resting on the wing walls 3—3, is a cap stone 10, forming the roof of compartment "A."

Extending upward from the foundation 8, and attached to each of the wing walls 3—3, is a wall 11, which, with the cross wall 7, and the refractory spout 9, forms the compartment "B." This compartment is designed to be a heating kiln, by the introduction of gas through burners 12, the objects of which will be more fully set forth.

For the purpose of regulating the temperature within the compartment "A" when required, I provide ports 13, through which gas burners 13' are introduced, the object of which will be more fully set forth.

The refractory spout 9, constituting the roof of compartment "B," is designed to be heated from below by means of fuel gas introduced through the burners 12—12, and for the purpose of producing and maintaining a uniform heat area to the spout over which the glass is flowed, the edges nearest to the wing walls 3—3, are made proportionately thinner than the center thereof. For the further purpose of aiding to maintain a uniform temperature over the upper surface of the spout 9, the formation of the compartment is so designed, that the cap stone 10 forming the roof of this compartment, being constructed with a greater thickness at its center than at the edges thereof, there will be an equalizing of the radiation therefrom over the surface of the spout 9.

I thus provide a conduit comprising a flowing zone through which the glass is flowed, which is plano-convex in cross section, the purposes of which will be more readily understood, as the peculiar properties of glass in its semi-fluid condition, are more clearly set forth, as hereinafter explained. For the further purposes of aiding to maintain the desired temperature within the glass flowing zone, and especially in that part of the zone, where the glass turns the rounded nose of the spout 9, I provide a suitable shielding means, consisting of a vertically movable refractory body 18, shown in Figs. 5 and 6, suitably suspended, with its lower end extending into compartment "A", and designed to be moved into close proximity to the sheet of glass as it passes over the rounded nose of the refractory spout 9, and arranged to be adjusted in proper relation to the glass. For the further purposes of maintaining the desired shape of the flume through which the glass passes, so as to equalize the heat radiating properties thereof, the movable refractory body 18, is so designed that the flowing zone through which the glass passes in rounding the nose of the spout, is planoconvex by virtue of the novel shape given to the face of the movable refractory body 18, adjacent to the sheet of glass where it curves over the refractory spout 9, said face being hyperbolical in formation.

The movable refractory body 18 also serves the purpose of shielding the glass as it passes over the refractory spout 9, when desired, from the temperature increasing means or temperature decreasing means, operating through the ports 13. A further purpose of the movable refractory body is to shield the surface of the glass as it flows over the rounded spout 9, from the direct contact with the flame from the burners 13' and to increase the temperature in that part of the flowing zone adjacent to the rounded nose of the refractory body 9, by direct radiation through the movable refractory body 18.

Referring to the drawings (Fig. 5) the movable shield 18, is shown hung suspended through the aperture 17, in the cap stone 10. The aperture 17 extends across the entire width of the compartment "A", and is designed to be closed when the movable body 18, is hung in place. For the purposes of properly suspending the movable shield 18, apertures 19, are made therethrough into which are fitted suitable stirrups 20, which pass upward through the permanent support 21, and are susceptible of vertical movement by the operation of the hand wheel 22, which is screw threaded over the end of the stirrup rod 23.

Referring to the drawings (Figs. 1 and 5) it will be observed that there is a narrow slit or opening 24, between the top of wall 11, and the refractory body 9. This opening being located in close proximity to the point where the sheet of glass leaves the rounded nose of the refractory body 9, the increased temperature emanating therefrom, will be directly applied to the sheet of glass as it leaves the flowing spout, and will offset the lower temperature existing, outside of the wall 11, to such extent as may be required. The amount of heat emanating from the above aperture may be controlled by the opening and closing of the flues 15. This heat applied to the sheet of glass as it leaves the flowing spout, also serves the purpose of giving the glass a brilliancy and fire polish that it is impossible to obtain otherwise.

Figure 4:
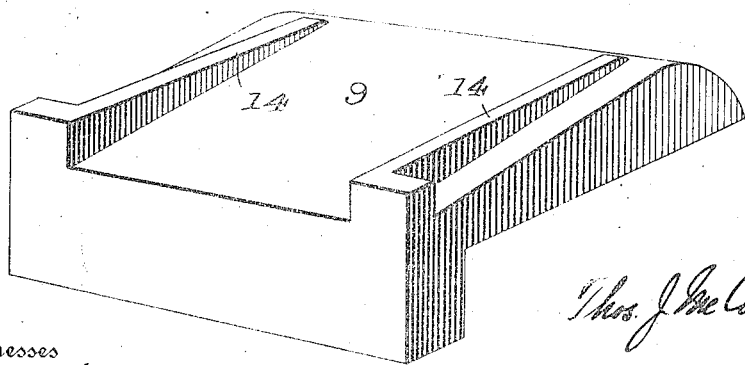
Fig. 4, is a detail perspective view of the spout over which the glass is flowed.

To provide for the further uniformity of the temperature of the glass, as it flows over the spout 9, and in maintaining the edges of the glass at the same temperature, while the edges are controlled and kept within the heat zone, I provide elevated ribs 14, shown in Fig. 4. These ribs are placed at a sufficient distance from the side walls 3—3 so as to permit of the heat within the flowing zone being applied to the ribs, against which the glass will come in contact, to facilitate their attaining the same temperature as that of the body of the spout 9.

I have found from practical experience that it is a matter of considerable difficulty to produce the requisite and required temperature in a mass of molten glass to secure the best results for flowing a sheet of glass from said mass, solely by the application of heat generating means over the sheet as it is being flowed, and the regulation of such means during the flowing process. Furthermore in the flowing of a sheet of glass over a wide area of flow, it has been disclosed by practical experience that the molten glass is liable to vary and be reduced in temperature in different portions of the sheet, due to its contact with the surfaces of the refractory body of a lower temperature over which it is flown, and this reduction in temperature at different parts of the sheet will cause an adhesion of the glass to the surfaces of the guide walls with which it comes in contact, and a gradual congealing of such adhering glass will occur to the detriment of the flow.

By the present invention, instead of entirely regulating the temperature of the molten glass being formed in sheets, from the temperature of the heating zone above the glass, I superheat the side of the sheet which comes in contact with the spout, somewhat above the degree of temperature required to suitably flow the glass, and I then produce the proper temperature to the top surface of the molten glass, comprising the sheet, by controlling the heat within the flowing zone allowing the cooling of the top surface of the sheet to a proper working degree. In order that the sheet of glass obtained may be uniform and the faces thereof entirely plane and highly brilliant, it is essential that the sheet should pass through a zone of such temperature that the upper surface of the glass in process of formation, tends to approach the congealing state, while the under surface remains liquid to such an extent as to facilitate its free passage over the spout, this being possible owing to the peculiar properties of the glass in its semifluid state. While the top surface of the sheet has to some extent congealed as it passes over the nose of the spout, it is still sufficiently malleable to be adapted to the curves necessary to convey it out of the flowing zone and to be placed upon a suitable conveyer, and still be sufficiently congealed as it leaves the nose of the flume to preserve its sheet formation and to cause an adherence thereto, and a proper congealing therewith, of the film of fluid surface on the under side of the sheet, and the present invention consists among other things of a method and apparatus for accomplishing these results.

Another feature of my invention is the method of the application of heat to the under side of the sheet of glass, while being flowed over the spout which is produced by direct radiation from the products of combustion within the compartment "B". The application of heat by like radiation to the upper surface of the glass as it turns over the rounded nose of the spout is produced by the refractory shield 18, from the burners 13′ in compartment "A".

The temperature by such radiation may be regulated at will, by merely varying the amount of fuel gas, which is introduced through the burners 12 and 13′. It is important for the success of the operation that it should be possible to bring the temperature of the spout to exactly such a degree that the liquid glass is able to flow constantly over it, without its adherence to the spout, and to be able to maintain this temperature. Upon this suitable uniformly tempered spout the upper surface of the sheet of glass becomes consistent, yet the under side remains in such state of fluidity as to flow freely and turn over the nose of the spout where it rapidly loses its fluidity, due to its contact with the cooler air between the sheet of glass 2′ and the wall 11, and is thus conveyed into a sheet of glass which is still slightly malleable, but already sufficiently set to maintain its sheet formation and is deposited upon a suitable support or conveyer as is intended to be used with this apparatus, substantially as shown and described in my application for U. S. Letters Patent Serial No. 627,933.

In order that the flowing operation may be successfully carried out, it is essential that the temperature of the spout should not become too great, as otherwise the glass would not be at the proper congealing state as it passes over the rounded nose of the spout. The means of proper regulation, and the novel formation of the flowing spout and the adjustable shield placed within the flowing zone as well as the walls of the compartment within which the flowing takes place, constitute some of the principal characteristics of this invention, in the sense that they permit of producing a continuous flow of a layer of glass from the liquid state to a gradual congealing into a solid state, without any unnatural strains, so prevalent where tension is applied to the glass while in its congealing state.

For the purposes of taking care of the products of combustion arising within the compartment "B" a discharge flue 15, is placed in communication with the compartment "B" on each side, extending upward parallel with the wing walls 3—3.

To likewise provide for the disposal of the products of combustion arising within the compartment "A", discharge flues 16 are placed through the wing walls 3—3, which communicating through the passage are under the horizontal bridge 4, receive the currents of air passing downward from the compartment "A". For the purpose of observing the flow of glass over the rounded nose of the spout 9, port hole 17, is placed through the wing walls 3—3. This port hole also serves the purpose of admitting relatively cooler air when necessary into the flowing zone. The discharge flues 15 and 16, after passing horizontally through the wing walls 3—3 are diverted in a vertical direction, and communicate with any suitable discharge.

It will be seen from the foregoing description that the glass from which the sheets are formed is conveyed from a mass of glass within a tank, over a gradually shallowing flume or spout extending into a suitably heat regulated compartment, and by the arrangement which I have provided, the path of flow of the glass is located between two heat zones of different temperatures, and of novel formation the degrees of which are controlled and governed according to the requirements necessary for a successful flowing of the glass, of any desired thickness.

Without limiting myself to the specific instrumentalities and method described, what I claim is:

1. An apparatus for making sheet glass comprising a glass tank for containing molten glass having a reduced extended end portion, an upwardly inclined bottom to said end portion forming the outer wall of said extending portion, adapted to form the glass extending outwardly over said inclined bottom into a sheet formation of a progressively reduced thickness, a horizontal movable carrier located directly beneath the outer wall adapted to divert the glass from a vertical to a horizontal plane, and means for conveying proper motion to said movable carrier to cause the glass deposited thereon to be maintained in sheet formation.

2. A sheet glass forming apparatus comprising a glass tank for containing molten glass having an extended end portion, an upwardly inclined bottom to said end portion forming the outer wall of said extended end portion, a diverted passage way adjacent to said outer wall through which the glass passes, a vertically movable refractory body located in said passage way, and means for varying the cross sectional area of said passage way by the movement of said refractory body.

3. An apparatus of the character described comprising a delivery tank for molten glass having a covered extended end portion, an upwardly inclined bottom to said end portion forming the outer wall thereof, a downwardly extended passage way located within said covered end portion, a movable refractory body located within said passage way, and means for varying the cross sectional area of said vertical passage way by the movement of said refractory body.

4. An apparatus of the character described comprising a delivery tank for molten glass having a covered extended end portion, an upwardly inclined bottom to said end portion forming the outer wall thereof, a downwardly extended passage way located within said cover end portion, a movable refractory body located within said passage way, and a horizontal movable carrier located directly beneath the point of the outer wall adapted to divert the downward movement of the glass to a horizontal plane.

5. A sheet glass forming apparatus, comprising a glass tank for containing molten glass having an extended end portion, an upwardly inclined bottom wall to said end portion, positioned to hold a portion of the volume of glass in the tank, a downwardly extended passage way located adjacent to the outer wall of the extended end portion through which said glass passes, and means for controlling the temperature within said passage, by varying the cross sectional area thereof.

6. An apparatus of the character described comprising a tank for molten glass having a covered extended end portion, an upwardly inclined bottom to said end portion forming the outer wall of said extended portion, a heating kiln formed within the outer wall of the extended end portion the top wall of said kiln forming the inclined bottom of said end portion, and means comprising a horizontal movable carrier located directly beneath the outer wall to divert the glass from a downward movement to a horizontal plane by which the glass overflow deposited thereon is maintained in sheet formation.

In testimony whereof I have affixed my signature in presence of two witnesses.

THOMAS J. McCOY.

Witnesses:
  T. TREVOR McCoy,
  N. D. HOWELLS.